United States Patent [19]

Cockram

[11] 4,123,287
[45] Oct. 31, 1978

[54] GLASS FIBRES FOR REINFORCEMENT OF CEMENT PRODUCTS

[75] Inventor: David R. Cockram, Wigan, England

[73] Assignee: Pilkington Brothers Limited, Merseyside, England

[21] Appl. No.: 708,977

[22] Filed: Jul. 26, 1976

[30] Foreign Application Priority Data

Jul. 24, 1975 [GB] United Kingdom ............... 31016/75

[51] Int. Cl.² .......................... C04B 7/02; D02G 3/00
[52] U.S. Cl. ....................................... 106/99; 428/375;
428/391; 428/392
[58] Field of Search .................. 428/375, 391, 392;
106/99, 98; 260/38; 156/167, 180

[56] References Cited

U.S. PATENT DOCUMENTS

| | | | |
|---|---|---|---|
| 2,694,025 | 11/1954 | Slayter et al. | 428/392 X |
| 3,004,941 | 10/1961 | Mestdagh | 260/38 |
| 3,502,610 | 3/1970 | Thompson | 428/392 X |
| 3,576,705 | 4/1971 | Goldsworthy | 428/392 X |
| 3,679,507 | 7/1972 | Marzocchi | 428/392 |
| 3,783,092 | 1/1974 | Majumdar | 428/392 X |
| 3,793,130 | 2/1974 | Marzocchi | 428/392 X |
| 3,854,986 | 12/1974 | Chualovsky | 428/391 |

*Primary Examiner*—Lorraine T. Kendell
*Attorney, Agent, or Firm*—Sughrue, Rothwell, Mion, Zinn and Macpeak

[57] ABSTRACT

Glass fibres for use as reinforcement in cement products are coated with a composition containing a material to protect them against the alkaline environment, which comprises at least one dihydroxybenzoic acid, preferably 2,5 dihydroxybenzoic acid, and which may also comprise a partially-cured A-stage phenol-formaldehyde resin of the water-dilutable resole type. A further coating of an epoxy resin may be applied over this composition to protect it from abrasion during handling of the fibres and preparation of the cement products. The coating composition may be applied as a size to the individual filaments immediately after they have been drawn from a bushing, or it may be applied later after the filaments have been combined into a strand.

8 Claims, 2 Drawing Figures

GLASS FIBRES FOR REINFORCEMENT OF CEMENT PRODUCTS

BACKGROUND OF THE INVENTION

1. Field of the Invention

This invention relates to glass fibres, which are intended for use as reinforcement in cement products, and which are provided with a protective coating.

2. Description of the Prior Art

In the alkaline environment of a normal Portland cement, which is mainly due to the presence of lime (calcium hydroxide), fibres of generally available glass compositions, such as that widely known as E-glass, are rapidly attacked and weakened so that the additional strength imparted to the cement by the glass fibres is rapidly lost.

Various alkali-resistant glass compositions have been devised which retain their strength better in cement.

Thus British patent specification No. 1,200,732 (National Research Development Corporation) describes and claims a composite fibre/cementitious product comprising fibrous reinforcing material distributed throughout a cement matrix, in which the reinforcing material is primarily a glass having per se a degree of alkali resistance such that when tested in the form of an abraded fibre of length 2½ inches and diameter of from 0.4 to 1.0 × 10$^{-3}$ inches said fibre has a tensile strength of at least 100,000 p.s.i. after treatment with saturated aqueous $Ca(OH)_2$ solution at 100° C. for 4 hours followed by successive washings at ambient temperature with water, then with aqueous hydrochloric acid (1%) with 1 minute, water, acetone, followed by drying, said fibre experiencing not more than 10% reduction in diameter during said test.

British patent specification No. 1,243,972 (N.R.D.C.) discloses and claims such composite fibre/cementitious products in which the glass contains at least 65% $SiO_2$ and at least 10% $ZrO_2$ by weight. British patent specification No. 1,243,973 (N.R.D.C.) discloses and claims alkali-resistant glass fibres derived from a glass containing, in weight percentages, 65–80% $SiO_2$, 10–20% $ZrO_2$ and 10–20% of a network modifier which is an alkali metal oxide, an alkaline earth metal oxide or zinc oxide, said glass being one which has a tensile strength as set out above.

Further ranges of glass compositions for forming alkali-resistant glass fibres are disclosed and claimed in our British patent specification Nos. 1,290,528 and 1,389,019. Pat. No. 1,290,528 claims glass compositions for forming glass fibres which are to be incorporated as reinforcement in cementitious products, comprising, in molecular weight percentages:

|         |     |    |     |
|---------|-----|----|-----|
| $SiO_2$ | 62% | to | 75% |
| $ZrO_2$ | 7%  | to | 11% |
| $R_2O$  | 13% | to | 23% |
| $R'O$   | 1%  | to | 10% |
| $Al_2O_3$ | 0% | to | 4%  |
| $B_2O_3$ | 0% | to | 6%  |
| $Fe_2O_3$ | 0% | to | 5% |
| $CaF_2$ | 0%  | to | 2%  |
| $TiO_2$ | 0%  | to | 4%  | wherein $R_2O$ represents $Na_2O$, up to 2 mol.% of which may be replaced by $Li_2O$, and $R'O$ is an oxide selected from the group consisting of the alkaline earth metal oxides, zinc oxide (ZnO) and manganous oxide (MnO), the balance if any consisting of other compatible constituents.

British Patent No. 1,389,019 claims glass compositions for forming into alkali-resistant continuously-drawn glass fibres, comprising in molar percentages on the oxide basis:

|         |    |    |      |
|---------|----|----|------|
| $SiO_2$ | 67 | to | 82   |
| $ZrO_2$ | 7  | to | 10   |
| $R_2O$  | 9  | to | 22.5 |
| $F_2$   | 3  | to | 9    |
| $Al_2O_3$ (computed as $AlO_{1.5}$) | 0 | to | 5 | the balance, if any, consisting of other compatible constituents, where R = Na, up to 5 mol.% of which may be replaced by Li or K, and the fluorine is included in substitution for oxygen in one or more of the oxides, the maximum value of the molar percentage represented by $SiO_2 + ZrO_2 + AlO_{1.5}$ being dependent linearly on the content of each of $ZrO_2$ and $F_2$, ranging, when $F_2 = 9$ mol.%, from 89 mol.% when $ZrO_2$ content is 7 mol.% to 88 mol.% when the $ZrO_2$ content is 8.5 mol.%, down to 87 mol.% when the $ZrO_2$ content is 10 mol.%, the said maximum value being reduced by a further 5 mol.% over the whole scale when $F_2 = 3$ mol.%.

U.S. Pat. No. 3,840,379 (Owens-Corning Fiberglass Corporation) describes another range of alkali-resistant glasses, and glass fibres made from them, having compositions within the following range:

|         | Weight Percent |    |    | Mol Percent |    |     |
|---------|----|----|----|-----|----|-----|
| $SiO_2$ | 60 | to | 62 | 65  | to | 67  |
| CaO     | 4  | to | 6  | 4.5 | to | 6.5 |
| $Na_2O$ | 14 | to | 15 | 14.5| to | 16  |
| $K_2O$  | 2  | to | 3  | 1   | to | 2.5 |
| $ZrO_2$ | 10 | to | 11 | 5   | to | 6   |
| $TiO_2$ | 5.5| to | 8  | 4.5 | to | 6.5 |

Although alkali-resistant glass fibres as described in the above Patent Specifications retain their strength in cement much better than fibres of conventional glasses, such as E-glass, there is nevertheless, a gradual deterioration over long periods.

When producing continuous glass fibres for any purpose, it is normal practice to coat the individual continuously drawn glass fibres immediately after drawing, with a size composition which provides a mechanical protection and a lubricant for the fibres to minimise breakage and abrasion during subsequent handling, such as the bringing together of numerous individual fibres to form a strand and the winding of the strand on a spool or drum. The size compositions previously used on glass fibres for inclusion in a cementitious matrix do not have any material effect on the long term resistance of the glass to attack by the alkalis in cement.

Protective coating compositions have also been applied to glass fibres at various stages in their production and handling, and it has, for example, been proposed to use a furane resin in such a coating for increasing the alkali resistance of the glass fibre material to render it suitable for use in reinforcing concrete.

It has previously been proposed in our U.S. Pat. No. 3,954,490 to provide glass fibres intended for use as reinforcement in cementitious products, coated with a composition containing a protective material to reduce deterioration of the glass fibres when incorporated in such cementitious products, wherein the protective material consists of at least one monocyclic or polycyclic aromatic compound which has at least three hydroxyl groups on the aromatic ring or, in a polycyclic compound, on at least one of the aromatic rings.

In our U.S. Patent application Ser. No. 646,082, we have described another such coating composition containing, in addition to the trihydroxy aromatic compound, at least one partially-cured A-stage phenolformaldehyde resin of the water-dilutable resole type.

SUMMARY OF THE INVENTION

According to the present invention, glass fibres intended for use as reinforcement in cementitious products are coated with a composition containing, as a protective material, at least one dihydroxybenzoic acid.

It has been found that the use of a dihydroxybenzoic acid as a protective material in a size or other coating composition substantially reduces the rate of deterioration in strength of the glass fibres when incorporated in cementitious products, over long test periods, as compared with glass fibres which have no such protective coating. This effect is noticeable with the conventional E-glass fibres but a greater advantage is obtained with a glass which is already substantially alkali resistant, i.e. which satisfies the tensile strength requirement specified in British patent specification Nos. 1,200,732, 1,243,972 and 1,243,973 mentioned above. We prefer to use the size or other coating composition with glass fibres of the alkali-resistant glass compositions disclosed in our British patent specification Nos. 1,290,528 and 1,389,019, which can be fiberised at conventional fiberising temperatures of around 1320° C. and below.

It is believed that the deterioration in strength of glass fibres incorporated in cementitious products is closely connected with solution-phase reactions or processes at the glass surface, one example of which is the deposition of calcium hydroxide crystals from the saturated solution of calcium hydroxide present in the cementitious matrix at the interface between the glass and the cementitious matrix, and that one effect of the above mentioned dihydroxybenzoic acid in the coating composition is to inhibit or reduce such crystal formation. It is believed to be advantageous for this purpose that the dihydroxybenzoic acids have at least a certain degree of solubility in a calcium hydroxide solution. Examination by stereoscan microscope of fibres which have been set in cement has also indicated that those fibres coated with compositions according to the invention, where attacked by the alkali in the cement, exhibit a considerably smoother etch pattern than that observed on fibres not so coated. This again could contribute to the higher strength retained by the coated fibres.

The preferred dihydroxybenzoic acid is 2,5 dihydroxybenzoic acid.

Other dihydroxybenzoic acids which have been found suitable for use as protective materials in the present invention include:

2,6 dihydroxybenzoic acid
2,4 dihydroxybenzoic acid
2,3 dihydroxybenzoic acid
3,4 dihydroxybenzoic acid
3,5 dihydroxybenzoic acid Substituted derivatives of these dihydroxybenzoic acids may also be employed, but care must be taken to ensure that substituent groups are not present in the molecule which counteract the protective activity of the two hydroxyl groups in reducing deterioration of the glass fibres, to such an extent as to make the compound unsuitable for use. It is therefore necessary, in selecting substituted dihydroxybenzoic acids for use, to carry out comparative screening tests to ensure that the substituents have not reduced the protective activity to a level at which the rate of deterioration of the glass fibers is not materially reduced.

It will be realised that the dihydroxybenzoic acids can be expected to react with alkalis, e.g. the calcium hydroxide in cement, due to their phenolic character.

The concentration of the protective material required in the coating composition is dependent on several variables, and no exact limits can be stated which will encompass all the variables. The major factors to be considered in assessing the amount of protective material in the coating composition are as follows:

(a) the protective material's solubility in the carrier material used, (b) the protective material's solubility in calcium hydroxide solution, and coupled with this the effectiveness of the particular dihydroxybenzoic acid being considered in reducing the rate of deterioration of the glass fibres in a cement matrix. Thus a compound of high effectiveness with a low solubility in calcium hydroxide solution may be effective at the same concentration as a compound of low effectiveness with the high solubility in calcium hydroxide solution, (c) the cost of the dihydroxybenzoic acid used. It may be economically more desirable to use less of a more effective high cost compound, than a larger quantity of a less effective lower cost compound, (d) the quantity of coating composition being picked up on the fibre during the coating process, which will determine the actual quantity of protective material present at the interface between the glass fibre and the cement matrix.

In most cases a coating composition containing 5% by weight of protective material is effective, and it is unlikely that a coating composition containing more than 10% of protective material will be needed or economically feasible. However, in a suitable carrier and with a highly effective compound, concentrations of less than 1% could be feasible. A suitable screening test for assessing the effectiveness of the compounds as referred to above is described in more detail with reference to the examples. Compounds may be ranked in order of effectiveness by reference to the percentage improvement found in the screening test, as compared with fibres coated in the same way as the fibres being tested except that no protective material is present in the coating composition. Compounds producing an improvement of less than 10% will not be considered suitable for use.

The coating composition preferably also comprises a partially-cured A-stage phenolformaldehyde resin of the water-dilutable resole type, as described in our U.S. patent application Ser. No. 646,082.

It is of course well known that resole resins are formed by the reaction of phenol and formaldehyde in the presence of an alkaline catalyst, and that the partially cured A-stage resins are water-dilutable.

It has been found that the dried coating which results on the glass fibres from the application of a coating composition containing both the dihydroxybenzoic acid and the resole resin to the fibres, and its drying under conditions where the curing of the resole resin is completed or substantially completed, appears to reduce the immediate availability of the dihydroxybenzoic acid to the aqueous phase of the cement matrix when the fibres are incorporated in a cementitious mix.

Reducing the immediate availability of the dihydroxybenzoic acid has the effect of:

(i) increasing the efficiency of use of the dihydroxybenzoic acid by reduction of losses from the fibre surface during manufacture of the cementitious product; this loss is evident in such products made by spray-up techniques and would be extensive in composites made using premix techniques.

(ii) reducing the retardant effect of the dihydroxybenzoic acid on the setting characteristics of the cement.

(iii) resulting from (ii) of improving the early development of strength of glass-reinforced cement composites made with the treated fibres.

Where the composition is intended to be applied as a size to the fibres immediately after they have been drawn from the molten glass composition, the resole resin will normally be incorporated to serve as a film-forming agent. The size will also normally contain a linking agent, and will generally be water-based. The linking agent is a substance, such as a silane, which helps to hold the size composition on the surface of the glass fibres, probably by forming links with —OH groups on the glass surface.

The size composition preferably also contains a wetting agent to assist dispersion of the resole resin, or other film-forming agent, in the aqueous size.

As indicated above, in choosing a dihydroxybenzoic acid care must be taken to ensure that substituent groups are not present in the molecule which counteract the protective activity of the two hydroxyl groups and it is therefore necessary, in selecting compounds for use, to carry out comparative screening tests where substituent groups are present, to ensure that these substituents have not reduced the protective activity to a level at which the rate of deterioration of the glass fibres is not materially reduced. The need to select suitable compounds and resins by screening tests equally applies in the use of a coating composition containing an A-stage phenolformaldehyde resole resin. The screening test in this case must also take into account the possibility of couteracting the protective action of the two hydroxy groups by the reaction or intereaction of the dihydroxy compound with the methylol groups present in the resole resin.

Suitable resole resins for use in the present invention have been produced by reaction of 1 mole phenol with more than 2 moles formaldehyde in aqueous solution in the presence of an alkaline catalyst, for example by reaction of 1 mole phenol with 2.05 moles formaldehyde in the presence of barium hydroxide.

We believe it is important that the conditions under which the fibre is dried should be chosen so that the temperature is one at which curing can take place but such curing should not be such as to cause a loss in the dihydric character present in the coating composition before drying. We find that a temperature range of 115° to 160° C., and drying times of up to 12 hours, with resole resins of the kind referred to above, do not normally have any harmful effect on the ability of the coated fibre to withstand attack. Care should also be taken to check on the presence of free formaldehyde in the resin as this can in some circumstances reduce the availability of the dihydroxybenzoic acid to levels where the level of improvement in durability is not of commercial significance. We have found that free formaldehyde levels of the order of 7% by weight in the resin before dilution can be tolerated.

We are not certain how far the improvement in performance due to reducing the immediate availability of the dihydroxybenzoic acid to the aqueous phase of the cement matrix is due to actual reaction of the compound into the resole resin, or to it being merely trapped in the cured resole resin matrix, or a combination of both factors. However all our evidence to date indicates that the presence of the resole resin gives an improvement in performance of the fibres coated with the composition of the present invention over fibres coated with a size composition containing the same dihydroxybenzoic acid but without any resole resin in the size composition.

Where the composition is intended to be applied as a coating composition at a later stage in the production or handling of the glass fibres, i.e. after sizing and combination of the individual fibres into a strand, the dihydroxybenzoic acid may be dissolved in a non-aqueous solvent.

The invention also includes glass fibres for use as reinforcement in cement products, coated with a composition as described above. Preferably the glass fibres are formed from an alkali-resistant glass composition containing at least 5 mol.% $ZrO_2$.

The glass fibres may have a further protective coating applied after the glass fibres have been coated with the coating composition of the invention, so as to protect the coating composition of the invention from leaching during the initial contact with and curing of the cement matrix. This further protective coating may be, for example, an epoxy resin polymer, which can be applied as a solution in a solvent such as chloroform or acetone. This protective coating is believed to act primarily during the initial contact of the coated fibre with the wet cement.

The invention further includes cementitious products reinforced with coated glass fibres as described above.

The invention also resides in a method of coating glass fibres to reduce their rate of deterioration when incorporated in cementitious products, comprising applying to the glass fibres a coating composition as described above.

The invention also resides in a method of forming a glass fibre reinforced cementitious product, wherein glass fibres are coated with a composition as described above and are subsequently incorporated into a cementitious matrix.

DETAILED DESCRIPTION OF THE INVENTION

Figure 1:
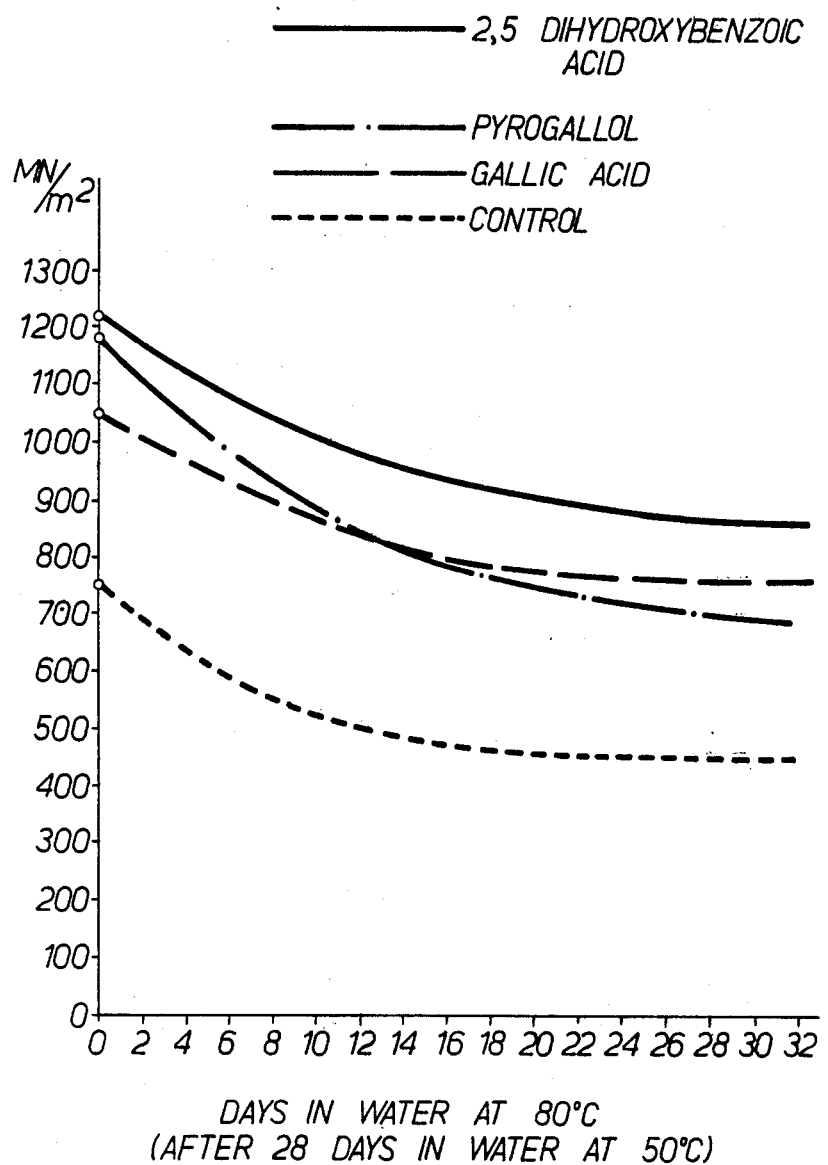
FIGS. 1 and 2 are graphs showing the results of tensile strength tests on glass fibre strands in accordance with the invention, compared with results obtained with strands coated with other compounds or with none.

As mentioned above, it is necessary in selecting dihydroxybenzoic acids for use as protective material to carry out comparative screening tests to assess the effectiveness of the compounds, particularly where the compounds contain substituent groups other than the necessary two hydroxyl groups and the carboxy group in the aromatic ring.

One suitable test which we have employed, referred to herein as Test 1, involves the following procedure: A strand of continuously-drawn, water-sized glass fibres is prepared from a substantially alkali-resistant zirconia-containing glass in accordance with our British Pat. No. 1,290,528, having the following composition in mol %.

| | |
|---|---|
| $SiO_2$ | 69% |
| $ZrO_2$ | 9% |
| $Na_2O$ | 15.5% |
| CaO | 6.5% |

A solution of 10% by weight of the compound under test in a carrier liquid or solvent (water, acetone or ethanol) is applied to the strand and dried at 50° C. for 30 minutes, to form a coating on the glass fibres. It is advisable to test each compound in more than one carrier liquid to ascertain the optimum coating system for that compound. After drying, the coating, a further protective coating is applied to the glass fibres by applying to the strand a solution of 10% by weight of epoxy resin and hardener in chloroform, which is then cured for 2 hours at 100° C. The middle section of each strand is then encased in a block of ordinary Portland cement paste which is allowed to cure for one day at 100% relative humidity and room temperature and kept for a period of, say, 28 days at elevated temperature, say 50° C., at 100% relative humidity, to produce accelerated ageing effects. The tensile strength of the encased part of the strand is then determined by applying load to both ends of the strand.

An alternative test, referred to herein as Test 2, is one in which strands of continuously-drawn, water-sized glass fibres, are placed in an aqueous solution which simulates the conditions in ordinary Portland cement, and contains 3.38 gm/liter KOH, 0.90 gm/liter NaOH, 3 gm/liter $Ca(OH)_2$ and 1% by weight of the compound under test. After immersion for 28 days at 50° C. the tensile strength of the strands is measured.

The results of a set of such comparative tests on glass fibre strands using six different dihydroxybenzoic acids and on control strands which, in Test 1 were coated with the carrier liquid and epoxy resin alone, and in Test 2 were placed in a solution without the compound under test, are set out in the following Table 1.

The results are given in terms of measured tensile strength in $MN/m^2$ after 28 days at 50° C., and as a percentage improvement on the comparable measured figure for the control.

The epoxy resin used in Test 1 forms a temporary protective over-coating over the coating which contains the dihydroxybenzoic acid. This is done to ensure retention of all the dihydroxybenzoic acid during processing, and thus to prevent any variation in the rate of loss of material from the glass fibre surface other than that dictated by the chemical nature and physical properties of the protective material under test. This temporary over-coating prevents any initial leaching out of the protective material but does not act as a barrier during the accelerated testing of the rate of deterioration after the cement has set.

TABLE 1

| Compound | Strength | TEST 1 Control | % increase over control | Strength | TEST 2 Control | % increase over control |
|---|---|---|---|---|---|---|
| 2,6 dihydroxybenzoic acid | 856 | 703 | 22% | 855 | 660 | 29% |
| 2,5 dihydroxybenzoic acid | 1207 | 703 | 72% | 1060 | 660 | 61% |
| 2,4 dihydroxybenzoic acid | 971 | 753 | 29% | 710 | 555 | 28% |
| 2,3 dihydroxybenzoic acid | 965 | 734 | 30% | | Not tested | |
| 3,4 dihydroxybenzoic acid | 810 | 753 | 8% | 787 | 657 | 20% |
| 3,5 dihydroxybenzoic acid | 715 | 703 | 2% | 595 | 495 | 20% |

In testing the 2,3 dihydroxybenzoic acid, curing of the epoxy resin was carried out for only 15 minutes at 80° C, but otherwise the tests were all carried out as described above.

It will be seen from Table 1 that the relative effectiveness of the various compounds is clearly demonstrated by the screening tests, though tests over a longer period are necessary to establish the degree of effectiveness of each compound more precisely. Both Test 1 and Test 2 indicate that 2,5 dihydroxybenzoic acid is the most effective compound. A percentage improvement figure of less than 10% in both tests would be an indication that the compound would not be suitable for use in the invention.

The results of some longer-term accelerated ageing tests using 2,5 dihydroxybenzoic acid, and comparing its effectiveness with two trihydroxy compounds, namely pyrogallol and gallic acid, are illustrated in FIG. 1. The amount of the polyhydroxy compounds picked up on the strands was approximately 5 to 6% by weight of the glass in each case. For these tests, the procedure described above in Test 1 was employed. The control strands were coated only with the carrier liquid and the epoxy resin. The samples were immersed in water at 50° C. for 28 days, and were then kept in water at 80° C. for up to 31 days. The results plotted in FIG. 1 indicate that the strands coated with a composition containing 2,5 dihydroxybenzoic acid retained their strength very much better than the control strands and quite noticeably better than the strands coated with compositions containing pyrogallol or gallic acid.

Figure 2:
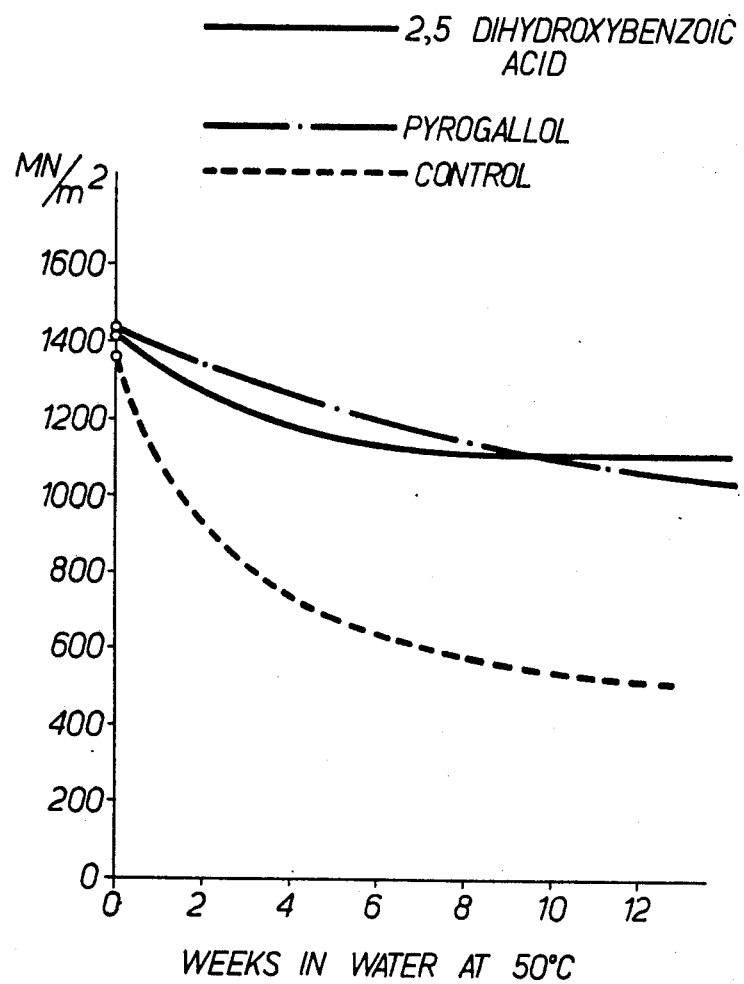

The results of further long-term tests comparing 2,5 dihydroxybenzoic acid with pyrogallol and a control are illustrated in FIG. 2. In these tests, the procedure of Test 1 was again employed, with a similar pick-up of the polyhydroxy compounds. The samples were kept in water at 50° C. for up to 12 weeks. In this series of tests, the strands coated with a composition containing 2,5 dihydroxybenzoic acid were obviously superior to the control strands. They were initially inferior to those using pyrogallol, but in the long term they appeared to retain their strength better.

Further tests have indicated that the amount of the dihydroxybenzoic acid picked up on the glass fibre strands is not critical, similar results to those of FIG. 2 having been obtained with only 0.7% pick-up, but that it is important to ensure that the overcoating of epoxy resin should be adequate to ensure initial protection, e.g. that the pick-up of epoxy resin should be 5% or more by weight of the glass fibres, though there does not seem to be any advantage in exceeding an epoxy resin pick-up of 10% by weight. Control tests with varying amounts of epoxy resin in the absence of any dihydroxybenzoic acid have confirmed, however, that it is the latter which provides the long term protection.

In practice, in preparing fibres for incorporation in cement, the dihydroxybenzoic acids will normally be incorporated in a size composition, which is then applied to the individual fibres in the conventional manner, immediately after they have been drawn from a bushing and before they are brought together to form a strand.

The size composition may comprise, in addition to the selected dihydroxybenzoic acid, a phenol-formaldehyde A-stage resole resin as described in connection with trihydroxy aromatic compounds in the Specification of U.S. patent application Ser. No. 646,082 now U.S. Pat. No. 4,062,690.

In specific embodiments of the present invention, the size composition was made up in the following manner.

A-stage phenol-formaldehyde resole resins are well-known, e.g. from U.K. patent specification Nos. 952,690 and 1,285,938. In the present embodiment, barium hydroxide was used as the catalyst in the manner described below, though sodium hydroxide or calcium hydroxide or other alkalis or even organic bases may be used, and the reaction conditions may be modified.

Phenol-formaldehyde resole resin

The mole ratio of reactants used was
1 mol phenol
2.05 mols formaldehyde
0.045 mols barium hydroxide pentahydrate.

In making up a batch of resin the following quantities of reactants were used
Phenol — 168 gallons
Formaldehyde 37% w/w — 284 gallons
Barium hydroxide pentahydrate — 230 lbs.

The catalyst was added to the phenol and formaldehyde mixture in a reaction kettle, and the temperature raised to 110° F. for 2 hours. The temperature of the reaction mixture was then raised to 137° F. for two hours and after that time to 147° F. for 1 hour. The condensate formed was then cooled to 100° F. for neutralisation.

The neutralisation of the alkaline catalyst can be carried out using a mineral acid usually sulphuric acid, though other acidic materials can be used.

The choice of the mole ratio of phenol to formaldehyde is dictated by the need to produce a water-dilutable resin which does not contain excessive free formaldehyde. A wide range of molar ratios is usable, dependent on the actual reaction conditions, and a typical range may be from 1.5 to 3.7 moles formaldehyde to 1 mole phenol.

In general the condensation reaction is normally carried out by heating the reactants together under agitation, the heating being for several hours at a series of increasing temperatures e.g. two hours at 110° F., two hours at 137° F. and finally 1 hour at 147° F. The procedure in U.K. patent specification No. 952,690 is 3 hours at 110° F., 4 hours at 125° F., and 6 hours at 140° F. In the case where calcium hydroxide is used as a catalyst, due to the exothermic nature of the reaction, as indicated in U.K. patent specification No. 1,285,938 the reactants without the catalyst may be first heated to about 100° F. and then allowed to rise to 125° F. over 60 minutes, the CaO being added over 15 minutes. The subsequent reaction conditions in U.K. patent specification No. 1,285,938 were then similar to those used with other catalysts.

Size Compositions

The neutralised resole resin may then be incorporated in a size composition made up as follows:

| | Weight % |
| --- | --- |
| Resole resin (made as described above) | 5.0 (solids content) |
| Cationic wetting agent (Arquad 12/50) | 0.6 |
| Silane coupling agent (A1100 ex Union Carbide) | 0.5 |
| 2,5 dihydroxybenzoic acid | 10.0 |
| Water to make | 100 |

Acetic acid added to give a pH of 4 to 4.5

Similar size compositions may be made up using 10 weight % of the other dihydroxybenzoic acids in place of the 2,5 compound.

Glass fibres of the alkali-resistant glass composition in accordance with British Pat. No. 1,290,528 set out above were drawn continuously from a multi-tipped bushing and water sized, and the fibres were combined into strands in conventional manner. To test the effectiveness of dihydroxybenzoic acid as coating additives when used in resole resin systems, a size composition was made up as follows:

| | Weight % |
| --- | --- |
| Resole resin (1 phenol:2.65 formaldehyde, catalysed with triethylamine 0.045–0.060 moles/mole phenol | 10 (solids content) |
| 2,5 3,4 or 2,4 dihydroxybenzoic acid | 10 |
| Water to make | 100 |

This size was applied to a continuous strand of the above glass and cured and dried at 115° C. for 30 minutes to form a coating on the glass fibres. The alkali resistance of the sized fibres was tested in a manner similar to that used in Test 1, in that strands of the sized fibres were each encased in a small block of ordinary Portland cement paste, leaving the ends of the strand exposed. The blocks were cured for one day at room temperature in an atmosphere of 100% relative humidity and then kept immersed in water for 28 days at 50° C. to produce accelerated ageing before the tensile strength of the strands was tested. The results obtained, compared with those obtained with water-sized fibres as a control, are set out in the following Table 2.

TABLE 2

| Compound | Tensile Strength | Control | % increase over control |
| --- | --- | --- | --- |
| 2,5 dihydroxy-benzoic acid | 993 | 692 | 43% |
| 3,4 dihydroxy-benzoic acid | 969 | 692 | 40% |
| 2,4 dihydroxy-benzoic acid | 914 | 626 | 46% |

The incorporation of the coated glass fibres into a cementitious mix can be effected by a spray-up technique. The glass fibre in first fed as a roving to a chopper, and the length of the chopped fibre can be adjusted by varying the number of blades in the chopper. A cement slurry and the chopped glass fibres are then sprayed on to a paper-covered perforated face of a suction mould. The mould is provided with adjustable screed boards round its edges thus allowing sheets of various thicknesses to be manufactured. After spraying to get a desired thickness, the top surface is levelled, and excess water removed by the application of suction. The sheet can then be transferred to a support by inverting the mould, and is then covered and stored until the desired curing time has passed, whereupon the board is ready for use. The water/cement ratio of the slurry is chosen according to the nature of the cement used. The glass to cement ratio is controlled by altering the number of rovings fed into the chopper at the same chopping rate, or by varying the speed of the chopper.

I claim:

1. Glass fibres intended for use as reinforcement in cementitious products, said fibres being coated with a composition comprising, as a protective material, at least one dihydroxybenzoic acid.

2. Glass fibres according to claim 1 wherein the protective material is 2,5 dihydroxybenzoic acid.

3. Glass fibres according to claim 1 wherein the fibres have a coating of an epoxy resin over the coating containing the dihydroxybenzoic acid.

4. Glass fibres according to claim 1 wherein the coating composition comprises a A-stage phenol-formaldehyde resin of the water-dilutable resole type which has been partially cured.

5. Glass fibres according to claim 4, wherein the coating composition has been applied as a size and comprises a linking agent to assist adherence to the glass fibre surfaces.

6. Glass fibres according to claim 5, wherein the linking agent is a silane.

7. Glass fibres according to claim 1 said fibres being formed from an alkali-resistant glass composition containing at least 5 mol.% $ZrO_2$.

8. Cementitious products reinforced with coated glass fibres, said fibres being coated with a composition comprising, as a protective material, at least one dihydroxybenzoic acid.

* * * * *